(12) United States Patent
Muench

(10) Patent No.: US 8,064,761 B2
(45) Date of Patent: Nov. 22, 2011

(54) METHOD TO DETERMINE AUTO FOCUS OF A DIGITAL CAMERA

(75) Inventor: Lothar Muench, Dettingen unter Teck (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 12/660,818

(22) Filed: Mar. 4, 2010

(65) Prior Publication Data

US 2011/0217030 A1    Sep. 8, 2011

(51) Int. Cl.
*G03B 17/00* (2006.01)

(52) U.S. Cl. .......................... 396/79; 348/356

(58) Field of Classification Search ........ 396/77, 396/79; 348/356
See application file for complete search history.

(56) References Cited

U.S. PATENT DOCUMENTS

| | | | |
|---|---|---|---|
| 5,083,150 A * | 1/1992 | Nagasaki et al. | 396/49 |
| 5,627,915 A * | 5/1997 | Rosser et al. | 382/219 |
| 6,023,056 A | 2/2000 | Fiete et al. | |
| 6,747,808 B2 | 6/2004 | Voss et al. | |
| 7,283,663 B2 | 10/2007 | Sobel et al. | |
| 7,389,042 B2 | 6/2008 | Lin et al. | |
| 7,538,815 B1 | 5/2009 | Belikov et al. | |
| 7,634,188 B2 | 12/2009 | Pnueli et al. | |
| 2001/0035910 A1* | 11/2001 | Yukawa et al. | 348/349 |
| 2004/0233320 A1* | 11/2004 | Watanabe | 348/354 |
| 2005/0036780 A1* | 2/2005 | Iwane | 396/111 |
| 2005/0179809 A1* | 8/2005 | Yagi et al. | 348/345 |
| 2007/0002152 A1 | 1/2007 | Fujiwara | |
| 2007/0110425 A1* | 5/2007 | Lin et al. | 396/133 |
| 2008/0226278 A1 | 9/2008 | Garg et al. | |
| 2009/0060329 A1 | 3/2009 | Nakajima et al. | |
| 2009/0074393 A1 | 3/2009 | Park et al. | |
| 2009/0079862 A1 | 3/2009 | Subbotin | |
| 2009/0102963 A1 | 4/2009 | Yeo et al. | |
| 2009/0115886 A1 | 5/2009 | Chen | |
| 2009/0115887 A1* | 5/2009 | Sugimoto | 348/349 |
| 2009/0135291 A1* | 5/2009 | Sugimoto | 348/347 |
| 2009/0136148 A1 | 5/2009 | Lim et al. | |
| 2009/0160999 A1* | 6/2009 | Nishimura | 348/345 |

OTHER PUBLICATIONS

Co-Pending, U.S. Appl. No. 12/660,560, filed Mar. 1, 2010, "A Method to Perform Sobel Calculations and Normalization for Autofocus in a Digital Camera," assigned to the same assignee as the current invention.

* cited by examiner

*Primary Examiner* — Christ Mahoney
*Assistant Examiner* — Fang-Chi Chang
(74) *Attorney, Agent, or Firm* — Saile Ackerman LLC; Stephen B. Ackerman

(57) ABSTRACT

An image is focused onto an image sensor array by efficient movement of an adjustable focus lens by a lens focus motor. A minimum of three focus positions is required to determine an estimated best focus position of the lens focus motor. After which a sweep of the focus positions surrounding the estimated best focus position is performed to verify and determine the best actual focus position of the lens focus motor. A sharpness value of the image being focused comprising a Sobel edge detection or other detections means provide sharpness data to evaluate image sharpness at various lens focus motor positions.

16 Claims, 5 Drawing Sheets

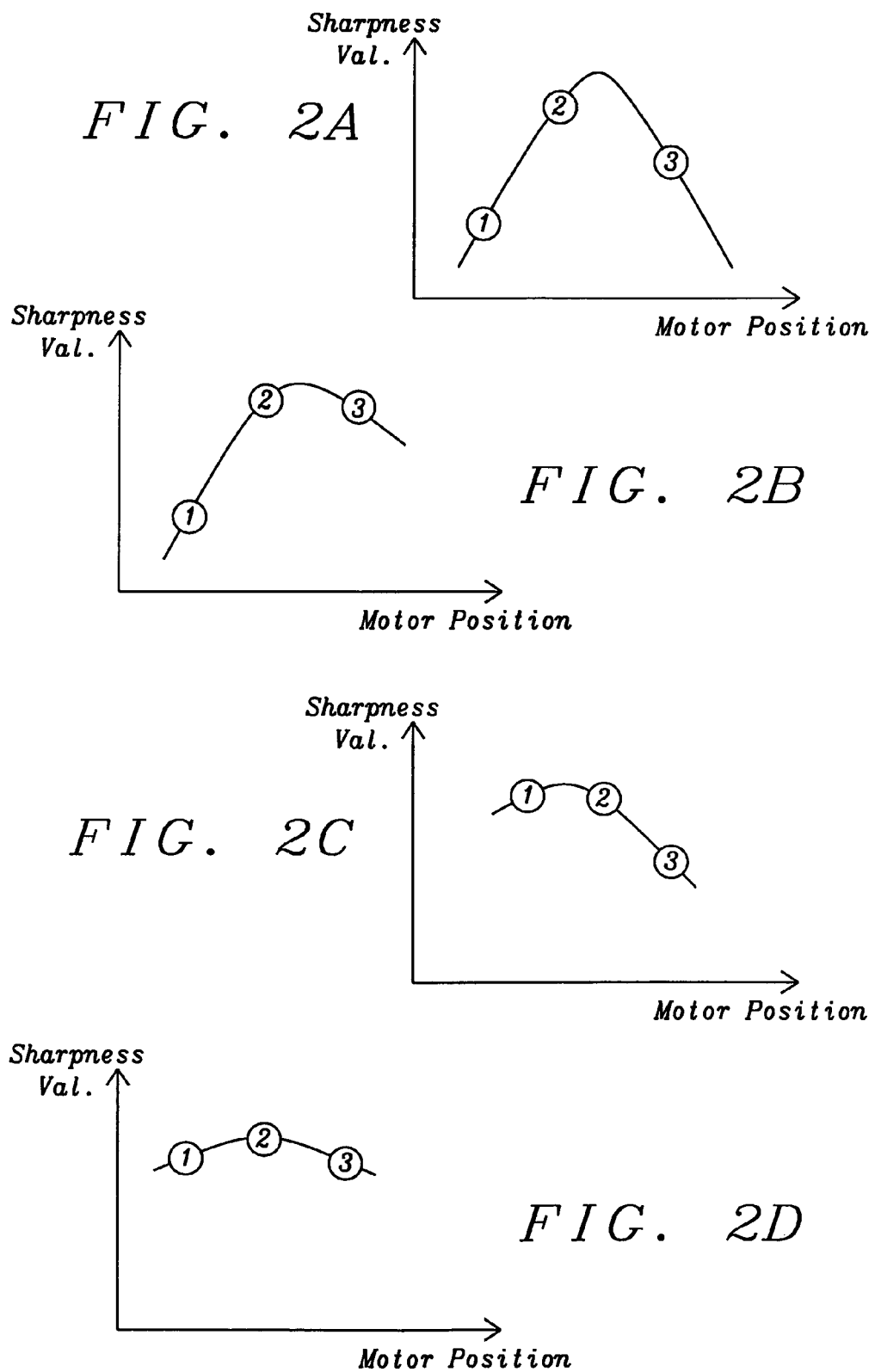

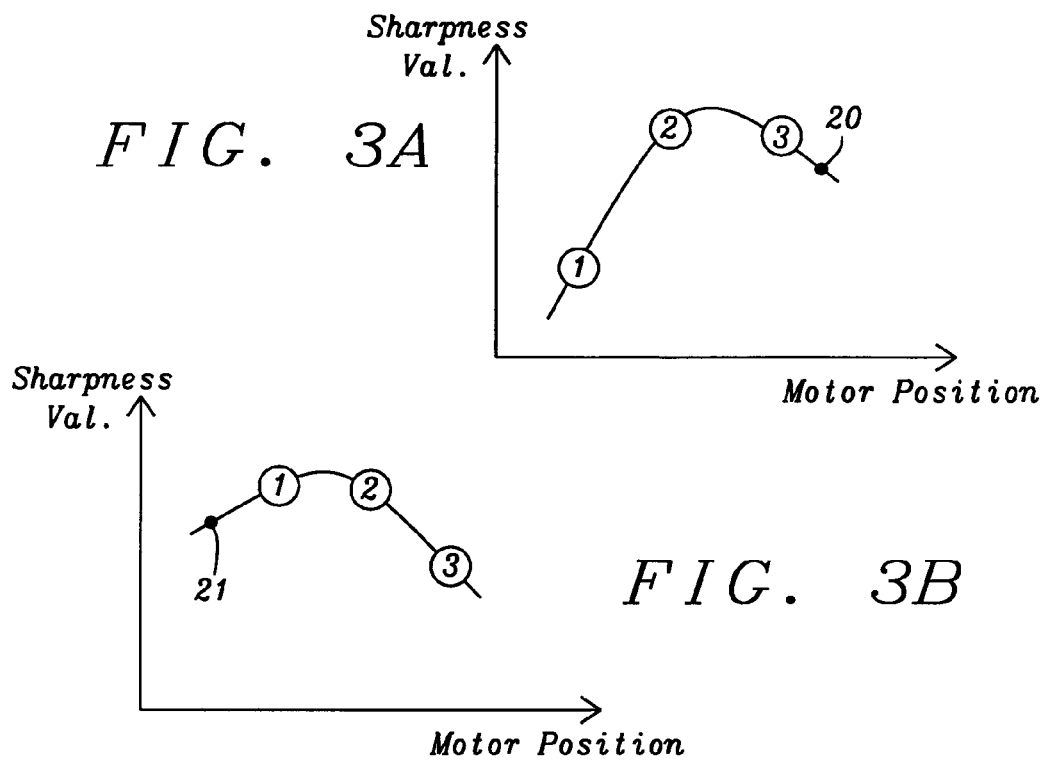
FIG. 3A
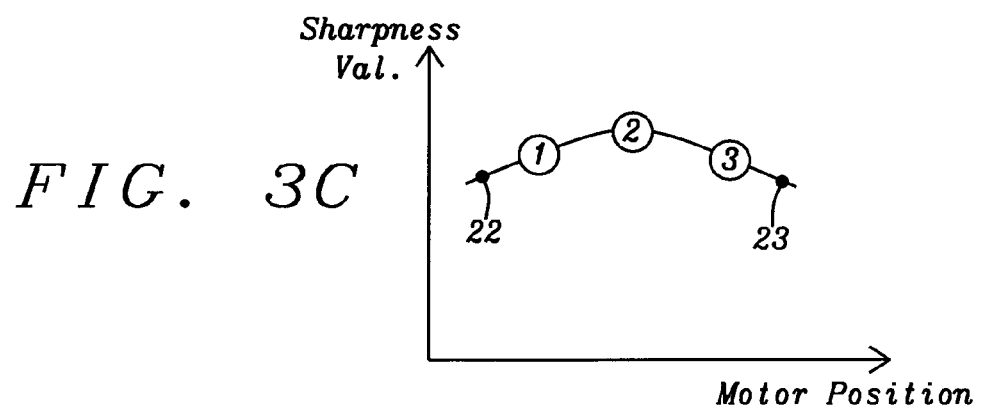
FIG. 3B
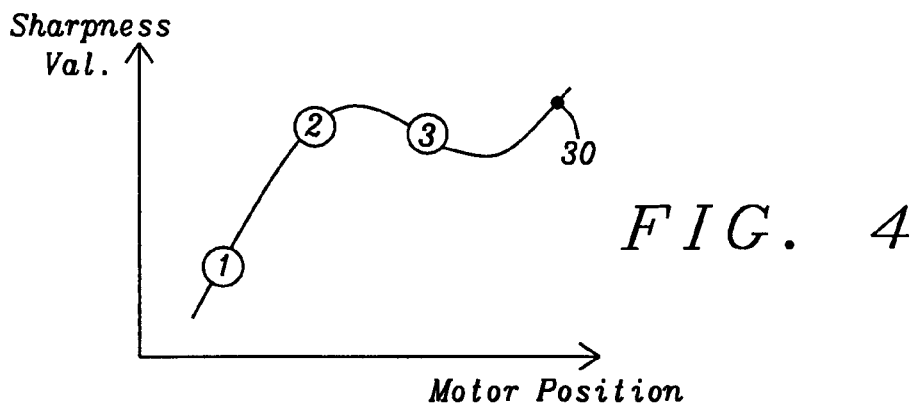
FIG. 3C
FIG. 4

METHOD TO DETERMINE AUTO FOCUS OF A DIGITAL CAMERA

This application is related to U.S. patent application Ser. No. 12/660,560, filed on Mar. 1, 2010, and assigned to the same assignee as the present invention, and which is herein incorporated by reference in its entirety.

BACKGROUND OF THE INVENTION

1. Field of Invention

The present invention is related to digital cameras and in particular to efficiently determining the automatic focus of a digital camera.

2. Description of Related Art

In digital cameras with auto focus the amount of time that the auto focus routine takes is often critical in being able to capture the desired image. This is particularly important when action or movement of the subject is involved comprising sports events, children at play, animals and other moving objects. The user of an auto focus digital camera can become frustrated when the digital camera refuses to capture a picture because the lens focus hasn't or cannot be found. It is therefore critical that a digital camera auto focus provide a fast and accurate focus of a subject of a picture image.

The focusing of an image can be complicated by the complexity of the image and the lack of definitive portions of the image in a focus box, for instance clear differences between the subject of interest and the background surrounding the subject, as can be the case when performing analysis of an edge for sharpness. Further complicating auto focus is a moving subject where the focus box must be maintained on the moving subject to avoid focusing on the background. Having a fast accurate auto focus method helps mitigate the problems associated with movement of the subject and the frustration of the user of a digital camera.

US Patent Application Publication No. 2009/0136148 (Lim et al.) is directed to a method and apparatus for digital auto-focus, wherein a local block generator creates a local block image from an input image and a distance-estimation unit estimates a distance for each image in the local block. US Patent Application Publication No. 2009/0115886 A1 (Chen) is directed to an auto focus method for a digital camera, wherein a single image is used to obtain a lens focal position by using an edge detection algorithm to compute distance to an object. US Patent Application Publication No. 2009/0102963 A1 (Yeo et al.) is directed to an auto focus image system, which includes an image sensor coupled to a controller that captures an image that has at least one edge with a width, wherein the controller generates a focus signal that is a function of the edge width. In US Patent Application Publication No. 2009/0079862 A1 (Subbotin) a method and apparatus is directed to determining the need to refocus an imaging device using a blur value that determines sharpness. In US Patent Application Publication No. 2009/0074393 A1 (Park et al.) a method and apparatus is directed auto-focus of imaging devices, which includes a distance-calculation based on blur of at least two images.

US Patent Application Publication No. 2009/0060329 A1 (Nakajima et al.) is directed to an image data analyzing device that detects the number of blurred pixels and compares to the total number of pixels to determine the upper size limit of an output image. US Patent Application Publication No. 2008/0226278 (Garg et al.) is directed to multiple sets of pixels wherein each set represents an image with different degrees of focus, whereupon the focus of an image determined by comparing variation of luminance of pixels representing an object. US Patent Application Publication No. 2008/0181595 A1 (Pnueli et al.) is directed to a focusing method that entails receiving a focusing image and shifting the focusing image to obtain a shifted focusing image whereby a focus metric is calculated from the focusing image and the shifted focusing image. US Patent Application Publication No. 2007/0002152 A1 (Fujiwara) is directed to a digital camera that has an edge enhancing section to enhance edges of image data whereby a focus is determined to be good or bad and adjusts the degree of edge enhancement wherein focusing time is shortened.

In U.S. Pat. No. 7,538,815 B1 (Belikov et al) auto-focusing algorithms and implementation are directed to a machine inspection application that can be used with existing imaging hardware without additional components. U.S. Pat. No. 7,389,042 B2 (Lin et al.) is directed to an auto-focus method, wherein there are four lens movement states comprising initial, course, mid, and fine states within each state there are different lens search steps. In U.S. Pat. No. 7,283,663 B2 (Sobel et al.) a method and apparatus is directed to interpolating color image information wherein a processor determines whether there is an edge in the vicinity of a target pixel in which long scale interpolation is performed on image data if there is not an edge in close proximity of the target pixel. U.S. Pat. No. 6,747,808 B2 (Voss et al.) is directed to an electronic imaging device that is focused by capturing data samples of a region of at least one photo detector while changing focus settings and analyzing data samples. In U.S. Pat. No. 6,023,056 (Fiete et al.) a method is directed to an image capture system, wherein a plurality of edges are detected and the sharpness of the edges are measured.

SUMMARY OF THE INVENTION

It is an objective of the present invention to provide a lens focus of a digital camera by positioning a lens focus motor in at least 3 focus positions from a close focus to a distant focus to collect focus data and calculate an estimated best focus position of the lens focus motor.

It is further an objective of the present invention to perform a focus sweep around the estimated best focus position of the lens focus motor, wherein focus data is obtained at focus positions surrounding the estimated best focus position to determine the actual best focus position of the lens focus motor.

It is also further an objective of the present invention to reject a focus of an image, wherein the focus data demonstrates more than on increasing focus trend or more than one decreasing focus trend.

It is still further an objective of the present invention to create additional lens focus motor positions when one or more initial focus positions produce focus data that is within a defined range of an adjacent focus position in order to confirm a focus trend from which the estimated best focus position can be calculated.

In the present invention a lens focus motor is positioned at discrete points between a close focus and a distant (far) focus. The focus data collected at the discrete points form values that range from increasing focus to decreasing focus where a peak focus occurs in between at least two of the focus points. Determining the peak focus point (best actual focus point) by continuously moving the focus motor over the focus range and collecting data is too laborious and time consuming; therefore, a number of at least three focus motor positions that are equidistant from each other are used and focus data is collected for each focus motor position.

During the movement of the focus motor from the close focus distance to the far focus distance, the sharpness value of an image increases, similar to climbing a hill. Then after the peak of the hill, the sharpness value decreases, where the peak represents the best actual focus point. At least one focus motor position is established on the increasing focus side of the peak value with at least one focus motor position on the decreasing side of the peak value. Using three focus motor positions, an interpolation (triangulation) of the position data of the focus motor positions is used to calculate an estimated best focus point, where at least one focus motor position is before the peak of the sharpness value curve (increasing sharpness) and at least one focus motor position is after the peak (decreasing sharpness).

After calculating the estimated best focus position of the motor, a sweep of the motor positions either side of the estimated best focus position to determine the actual best focus position, which may be the same as the estimated best focus position. Thereafter the focus motor is moved to the actual best focus position so that the digital camera can capture the image that is now in focus.

BRIEF DESCRIPTION OF THE DRAWINGS

This invention will be described with reference to the accompanying drawings, wherein:

FIGS. 2A, 2B, 2C and 2D are sharpness value curves relative focus motor position of the present invention;

FIGS. 3A, 3B and 3C are examples of sharpness value curves of the present invention where additional focus motor positions are necessary to establish a focus trend;

FIG. 4 is an example of an illegal sharpness value curve of the present invention;

DETAILED DESCRIPTION OF THE PREFERRED EMBODIMENT

Figure 1:
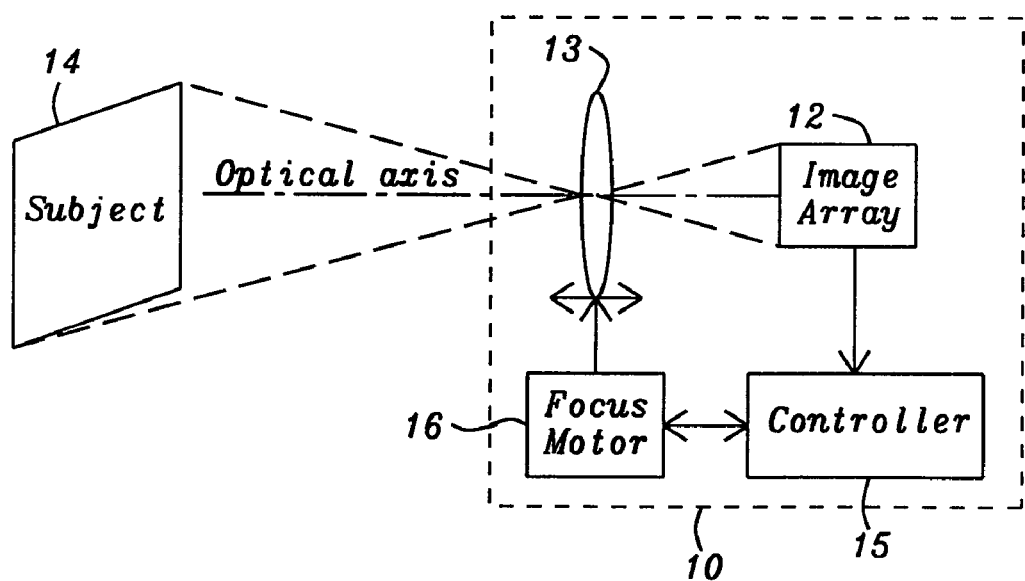
FIG. 1 is a block diagram of a lens focusing system of the present invention.

In FIG. 1 is a block diagram of a system that focuses an image of a subject 14 onto an image array 12 of a digital camera 10. A lens unit in which at least one lens element 13 of the lens group is moved along an optical axis to change the focus quality of a subject 14 that is being focused upon the image array 12. An image of the subject 14 is coupled to a controller 15 using a frame grabber, or equivalent. After which the algorithms stored in the controller analyze portions of the image data coupled to the controller using techniques of sharpness of an edge within the image captured by the image array 12, or any other technique that can be used to determine a numerical value for the sharpness of an image or a portion of an image. The controller 15 controls the focus motor 16 to various focus positions to allow sharpness of the image to be evaluated, and once an estimated best estimated focus position is determined from image data collected at various focus motor positions, the focus motor is varied around the best estimated focus position to determine that the estimated position is correct or an actual best focus position is located nearby.

In FIGS. 2A, 2B, 2C and 2D is shown graphs of sharpness value versus lens focus motor position of the present invention. FIG. 2A shows an example of a clear trend of an image being focused upon an image sensor using a lens focus motor. The locations 1, 2, and 3 along the sharpness value curve represent lens focus motor positions that are used to collect image focus data from the three focus positions. The motor position separation between 1 and 2 and the separation between 2 and 3 must be equidistant. Although there is an implied order in which the focus motor is positioned by the numbering in FIG. 2A, the order of the focus motor positioning can be 3-1-2, 1-3-2, 2-3-1 or any other order not stated. It should be noted that sharpness value can be any means by which sharpness of an image is measured, for example a Sobel value of the sharpness of an edge within the image.

In FIG. 2B an example of image sharpness value is shown where motor position 3 has a sharpness value that is below a defined range of the value of motor position 2, which results in an ambiguous trend and necessitates additional motor movement. FIG. 2C is another example of an ambiguous trend where motor position 1 is within a defined range of the sharpness value of motor position 2. FIG. 2D shows another example of ambiguity where motor positions 1 and 3 are below a defined range of motor position 2. In the case that an ambiguous trend is detected an additional movement is needed to clarify the sharpness peak.

FIG. 3A demonstrates an additional focus measurement 20 by positioning the focus motor further to the right (increase focus distance) of motor position 3 of FIG. 2B. The focus measurement of the sharpness value verifies the decreasing focus trend that position 3 could not establish because motor position 3 was below a defined range of focus motor position 2.

FIG. 3B is a repeat of FIG. 2C with the inclusion of an additional motor position 21 to the left of motor position 1 that verifies the left most "hill climbing trend" of increased sharpness value, which could not be determined in the example of FIG. 2C because the sharpness value of motor position 1 was below a defined range of motor position 2.

FIG. 3C is a repeat of FIG. 2D with the inclusion of two additional motor positions 22 and 23 along the sharpness value curve. These two additional motor positions were necessary to establish a trend for motor position 1 and motor position 3 because the sharpness value of both motor positions 1 and 3 were below a defined value of the sharpness value of motor position 2. The additional sharpness value measurements 22 and 23 establish increasing trend of the sharpness value to the left of motor position 2 and decreasing trend of the sharpness value to the right of motor position 2, thus allowing an interpolation of sharpness data to estimate the best focus position of the lens focus motor.

FIG. 4 is an example of the present invention demonstrating an illegal focus trend. The plot of sharpness value versus focus motor position is similar to FIG. 3A, except as an additional focus motor position is taken the sharpness value 30 trends upward, which produces an illegal focus trend, and the attempt for focus of the image is stopped issuing an error message. The cause for the example in FIG. 4 is that there is no clear peak in sharpness value or that the sharpness values that are obtained are noisy. Other illegal, or ambiguous, focus trends can occur at the boundaries of the focus motor adjustment where it is impossible to verify a focus trend, which can happen at a close focus position or the furthest focus position of the lens focus motor.

Figure 5A:
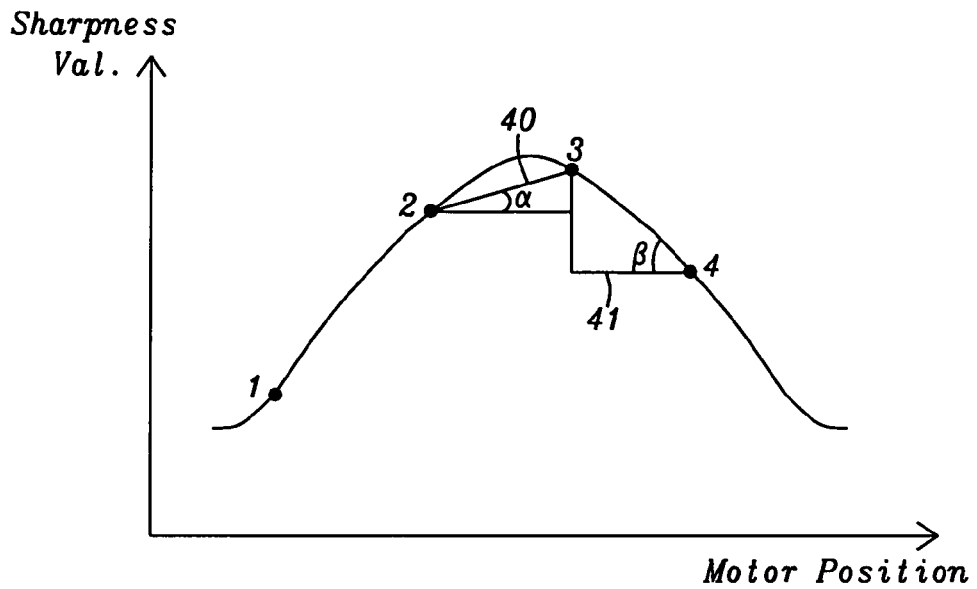
FIGS. 5A and 5B are a demonstration of the interpolation of points of focus motor position used to calculate the best estimated focus point of the present invention, where the angle α of the left most triangle is less than the angle β of the right most triangle.
Figure 5B:
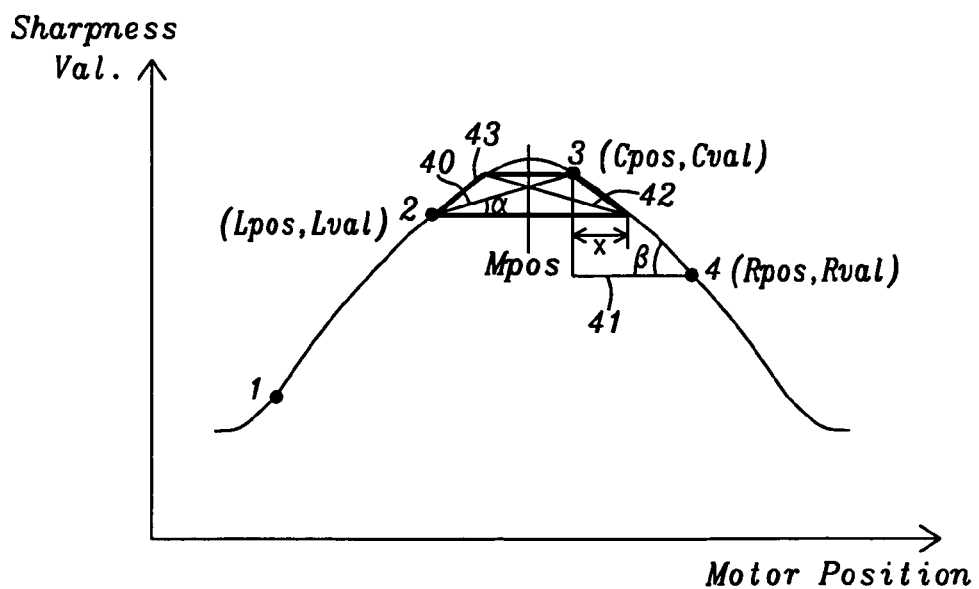

FIGS. 5A and 5B graphically demonstrate the calculation of the estimated best focus position by the controller of a digital camera for the lens focus motor. In FIG. 5A is shown a clear unambiguous focus curve of sharpness value versus lens focus motor position where a trend in increasing focus is formed between points 1 and 2 and a decreasing focus trend is formed between points 3 and 4. A first right angle triangle 40 having an angle α is formulated between focus points 2 and 3. A second right angle triangle 41 having an angle β is formulated between focus points 3 and 4 where β>α. The first triangle containing the angle α is mirrored 42 and moved until the apex of angle α intersects the hypotenuse of the second triangle 41 containing the angle β, as shown in FIG. 5B.

A trapezoid 43 is formulated, as shown in FIG. 5B, between motor position 2 (Lpos), motor position 3 (Cpos), the intersection of the apex of angle α of the mirrored triangle 42 and the apex of the angle opposite the angle α in the mirrored triangle 42. Focus data from motor positions 2, 3 and 4 are used to interpolate through triangulation to determine the estimate best focus point Mpos, which is the axis of the trapezoid and is also the intersection of the hypotenuses of the first triangle 40 and the shifted mirror of the first triangle 42. The focus data used in the calculation of Mpos is from point 2, Lpos (focus motor position at point 2) and Lval (sharpness value at point 2); from point 3 Cpos (motor position at point 3) and Cval (sharpness value at point 3) and from point 4 Rpos (motor position at point 4) and Rval (sharpness value at point 4).

The tangent of angles α and β allows the determination of which angle is larger. Further the data used to determine which angle is larger is instrumental in determining the estimated best focus position Mpos of the lens focus motor. For the condition illustrated in FIGS. 5A and 5B where α<β, the inequality of EQ. 1 allows the determination of which angle is larger. Equation EQ. 2 calculates the distance X along the base of the mirrored triangle 42 from the hypotenuse of the triangle 41 containing the angle β. Calculating the value of X allows the length of the base of the trapezoid 43 to be determined in EQ. 3 and therefore Mpos by dividing by the value of two.

$$\forall \alpha, \beta;\ 0° < \alpha, \beta < 90°$$

$$\alpha = \tan^{-1}\left(\frac{Cval - Lval}{Cpos - Lpos}\right),\ \beta = \tan^{-1}\left(\frac{Cval - Rval}{Rpos - Cpos}\right)$$

For α<β

$$\tan(\alpha) < \tan(\beta)$$

$$\frac{Cval - Lval}{Cpos - Lpos} < \frac{Cval - Rval}{Rpos - Cpos}$$

$$(Cval-Lval)(Rpos-Cpos) < (Cval-Rval)(Cpos-Lpos) \qquad \text{EQ 1}$$

$$\frac{X}{Rpos - Cpos} = \frac{Cval - Lval}{Cval - Rval} \Leftrightarrow X = (Rpos - Cpos)\frac{Cval - Lval}{Cval - Rval} \qquad \text{EQ 2}$$

$$Mpos = Lpos + \frac{(Cpos - Lpos) + X}{2} = \frac{Cpos + Lpos + X}{2} \qquad \text{EQ 3}$$

Figure 6A:
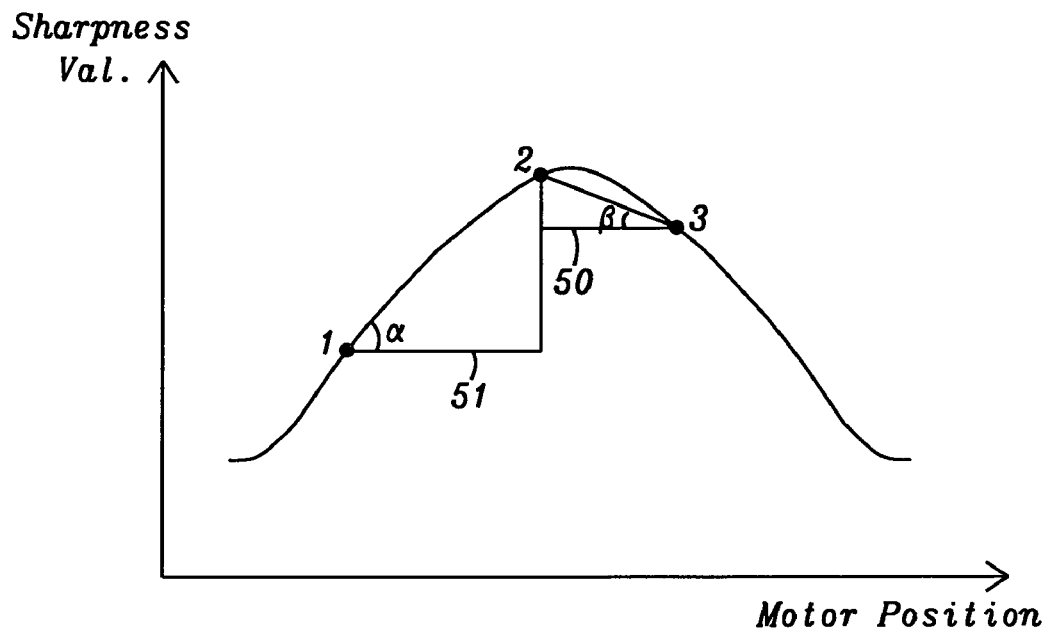
FIGS. 6A and 6B are a demonstration of the interpolation of focus motor positions to calculate the best estimated focus point of the present invention, where the angle α is larger than the angle β.
Figure 6B:
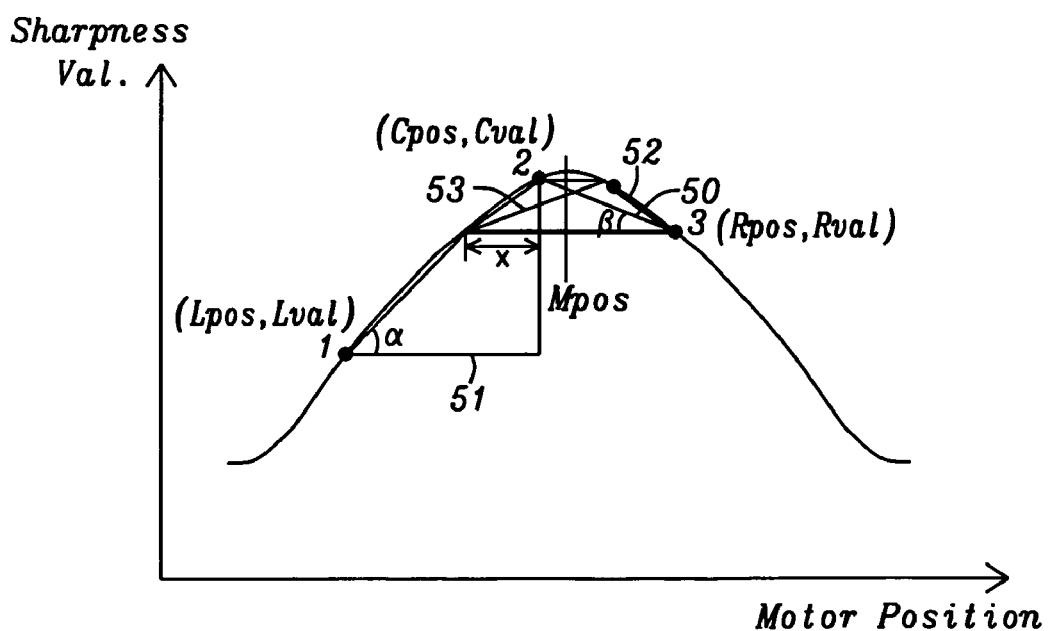

For the condition shown in FIGS. 6A and 6B, where α>β, a similar set of computations is required as provided for the conditions associated with FIGS. 6A and 6B. When α>β the right triangle 50 formed by lens focusing motor between focus points 2 (Cpos) and 3 (Rpos) is mirrored 53, and the apex of angle β of the mirrored right triangle 53 is moved to intersect the hypotenuse of the right triangle 51 comprising the angle α. A trapezoid 52 is formulated between the intersections of the apex of the angle β of the mirrored triangle 53 and the hypotenuse of the right triangle 51, motor position 2 (Cpos), the apex of the angle opposite the β angle of the mirrored triangle 53 and motor position 3 (Rpos).

Equation EQ. 4 derived from the inequality of the tangent for angles α and β determines which angle is larger. Equation EQ. 5 calculates the value of X which is the distance on the base of the trapezoid between the intersection of the hypotenuse of triangle 51 and the leg of triangle 51 opposite the angle α. The Value of X is used in equation EQ. 6 to calculate Mpos, which is the estimated best focus position of the lens focusing motor.

For α>β

$$\tan(\alpha) > \tan(\beta)$$

$$\frac{Cval - Lval}{Cpos - Lpos} > \frac{Cval - Rval}{Rpos - Cpos}$$

$$(Cval-Lval)(Rpos-Cpos) > (Cval-Rval)(Cpos-Lpos) \qquad \text{EQ 4}$$

$$\frac{X}{Cpos - Lpos} = \frac{Cval - Rval}{Cval - Lval} \Leftrightarrow X = (Cpos - Lpos)\frac{Cval - Rval}{Cval - Lval} \qquad \text{EQ 5}$$

$$Mpos = Cpos + \frac{(Rpos - Cpos) - X}{2} = \frac{Rpos + Cpos - X}{2} \qquad \text{EQ 6}$$

When Mpos is determined using either EQ. 3 or EQ. 6, a sweep of lens focus motor positions on both sides of Mpos is performed in search of the "actual best sharpness" position. If a better sharpness value is found than that of motor position Mpos, the lens focusing motor is moved to that better sharpness position defined as the "actual best sharpness" location, otherwise Mpos becomes the "actual best sharpness" setting of the lens focus motor.

Whereas, Sobel edge detection is the preferred means to determine sharpness value of the present invention, it is within the scope of this invention that any means for obtaining a digital value of image sharpness supports the method of focusing an image through a lens adjusted by a focus motor.

While the invention has been particularly shown and described with reference to preferred embodiments thereof, it will be understood by those skilled in the art that various changes in form and details may be made without departing from the spirit and scope of the invention.

What is claimed is:

1. A method for fast auto focus of a digital camera, comprising:
   a) adjusting an auto focus lens of a digital camera to at least three focus positions, wherein said focus positions equidistant apart;
   b) measuring a value of sharpness and focus motor position at each of the "at least three" focus positions, wherein at least one focus position is before a best focus position of the focus motor and at least one focus position is after the best focus position of the focus motor;
   c) determining a focus trend from said sharpness values at said focus positions;

d) determining an estimated best focus position of said lens by an interpolation; wherein the estimated best focus position determined by adding together one half a value of the focus motor position before the best focus position to one half the value of the focus motor after the best focus position and one half the value of a calculated offset, wherein the calculated offset determined by whether a first angle established by ascending focus measurement data points or a second angle established by descending focus measurement data points is larger, wherein the calculated offset is a positive value when the angle between descending focus measurement data points is larger, and wherein the calculated offset is a negative value when the angle between ascending focus measurement data points is larger;

e) verifying said estimated best focus position as actual best focus position; and f) adjusting said auto focus lens to said actual best focus position.

2. The method of claim 1, wherein said value of sharpness is a Sobel value.

3. The method of claim 1, wherein determining said focus trend further comprises one of the following:
   a) a valid (explicit) focus trend;
   b) an ambiguous focus trend; and
   c) an illegal focus trend.

4. The method of claim 3, wherein said valid focus trend comprises consecutive focus positions having increased sharpness value followed by at least one focus position with decreased sharpness value, wherein a difference in the increased or decreased sharpness values between adjacent focus positions is greater than a defined value.

5. The method of claim 3, wherein said ambiguous focus trend comprises consecutive focus positions where difference in sharpness value is less than a defined value.

6. The method of claim 3, wherein said illegal trend comprises more than one increasing trend or more than one decreasing trend.

7. The method of claim 1, wherein said interpolation performed by a triangular calculation using data from three focus positions, which further comprises forming two right triangles between the focus values of the three focus positions, wherein a smaller of the two right triangles is mirrored to form a trapezoid with the smaller triangle in which the mirrored triangle is offset a distance of focus motor position to allow the mirrored triangle to intersect a hypotenuse of a larger right triangle of the two triangles, and wherein an axis of the trapezoid forms the estimated best focus position of the focus motor.

8. The method of claim 1, wherein verifying said estimated best focus position comprises selecting a verification focus position in either or both focus directions from said estimated best focus position to determine said actual best focus position.

9. An auto focus system, comprising:
   a) a focus motor coupled to a moveable lens element of a digital camera, wherein said focus motor moved from a close focus position to a distant focus position by a controller, wherein focus motor stopped at a focus measurement position to allow a frame grabber of said controller to capture an image and evaluate sharpness of the image at the focus measurement position;
   b) said focus motor moved to subsequent focus measurement positions to allow said digital camera to evaluate sharpness of said image and to detect a focus trend, wherein at least one focus measurement position before a best focus position of the focus motor and at least one focus position after the best focus position;
   c) said digital camera estimates a best focus position of said motor with a calculation using interpolation of position data from three of the focus measurement positions, wherein the estimated best focus position determined by adding together one half a value of the focus motor position before the best focus position to one half the value of the focus motor after the best focus position and one half the value of a calculated offset, wherein the calculated offset determined by whether a first angle established by ascending focus measurement data points or a second angle established by descending focus measurement data points is larger, wherein the calculated offset is a positive value when the angle between descending focus measurement data points is larger, and wherein the calculated offset is a negative value when the angle between ascending focus measurement data points is larger;
   d) said digital camera performs a verification sweep of focus positions surrounding the estimated best focus position to detect an image sharpness greater than obtained from the estimated best focus position; and
   e) said focus motor positioned at an actual best focus position determined from the verification sweep.

10. The system of claim 9, wherein said sharpness of said image is determined with a Sobel measurement.

11. The system of claim 9, wherein said focus trend comprises one of the following:
    a) a valid (explicit) focus trend;
    b) an ambiguous focus trend; and
    c) an illegal focus trend.

12. The system of claim 11, wherein said valid focus trend comprises consecutive focus positions having increased sharpness value followed by at least one focus position with decreased sharpness value, whereby a difference of the increased and decreased sharpness value is greater than a given value.

13. The system of claim 11, wherein said ambiguous focus trend comprises consecutive focus positions where difference in sharpness value is less than a defined value.

14. The system of claim 11, wherein said illegal trend comprises more than one increasing trend or more than one decreasing trend.

15. The system of claim 9, wherein said interpolation performed by a triangular calculation using data from three focus positions.

16. The system of claim 9, wherein said actual best focus position determined by moving said motor to focus positions around said estimated best focus position to collect focus data and select the actual best focus position of the motor.

* * * * *